3 Sheets--Sheet 1.
G. CROMPTON.
Loom-Shedding Mechanism.
No. 6,314. Reissued March 2, 1875.
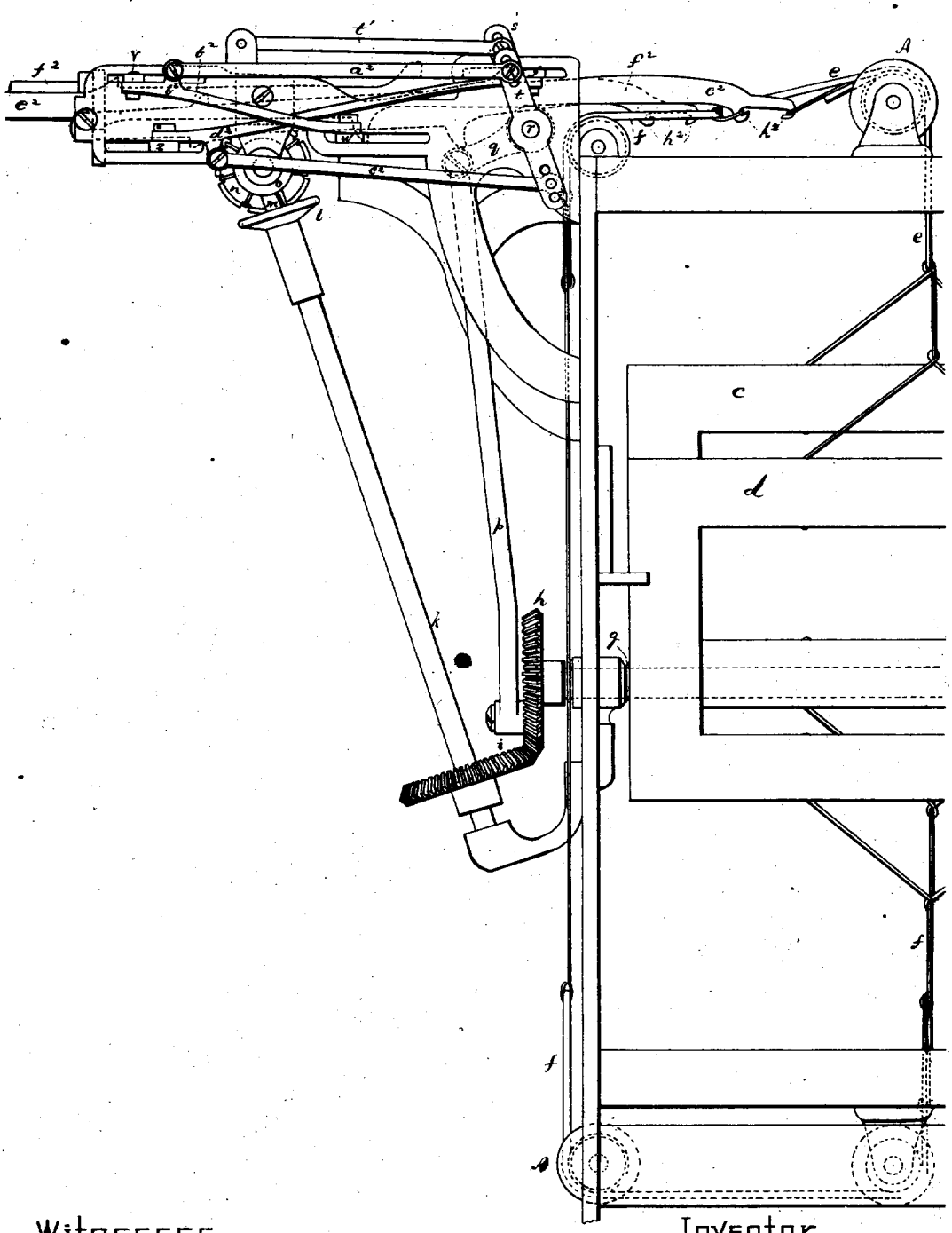
Witnesses.
Edw. W. Down
M. Gardner,
Inventor.
George Crompton
PER Crosby Gregory ATTYS.
THE GRAPHIC CO. PHOTO-LITH. 39 & 41 PARK PLACE, N.Y.

3 Sheets--Sheet 2.
G. CROMPTON.
Loom-Shedding Mechanism.
No. 6,314. Reissued March 2, 1875.
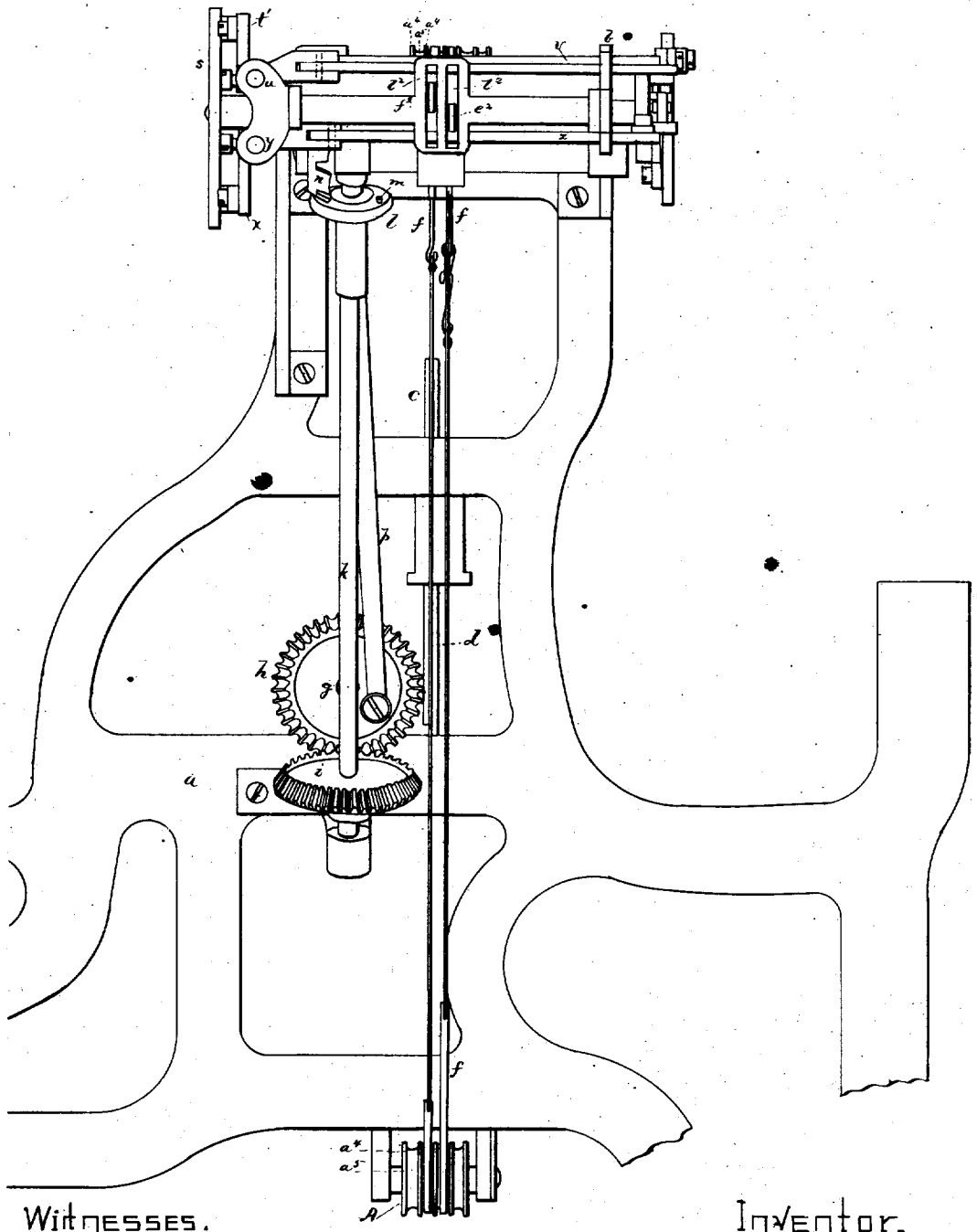
Witnesses.
Edw. W. Donn
M. Gardner,
Inventor.
George Crompton
PER Crosby & Gregory ATTYS.
THE GRAPHIC CO. PHOTO-LITH. 39 & 41 PARK PLACE, N.Y.

3 Sheets--Sheet 3.
G. CROMPTON.
Loom-Shedding Mechanism.
No. 6,314. Reissued March 2, 1875.
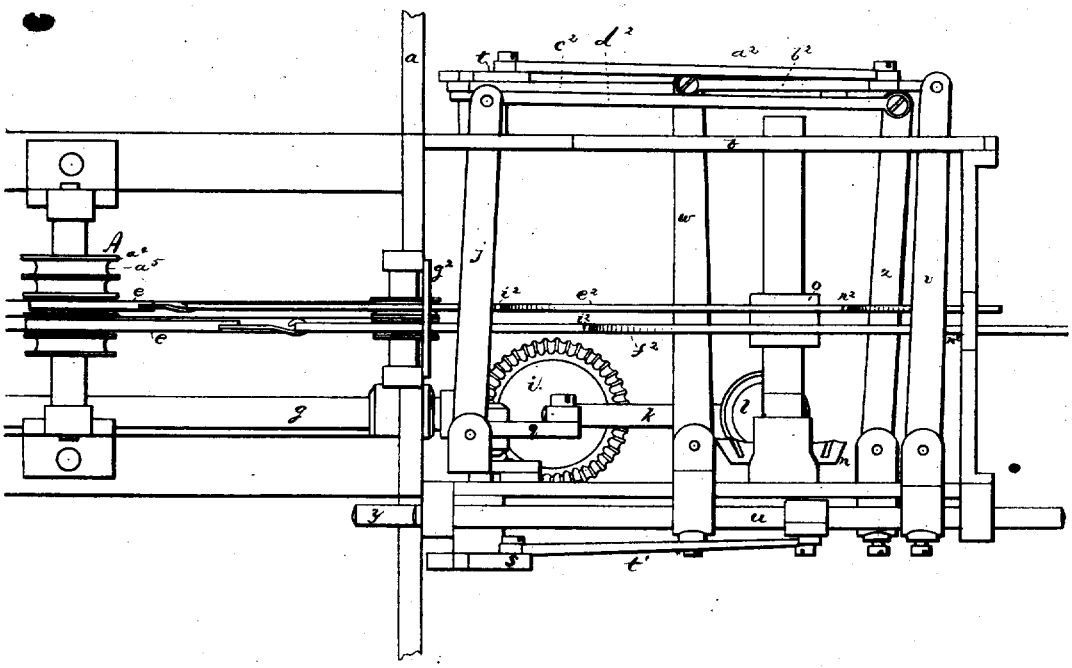
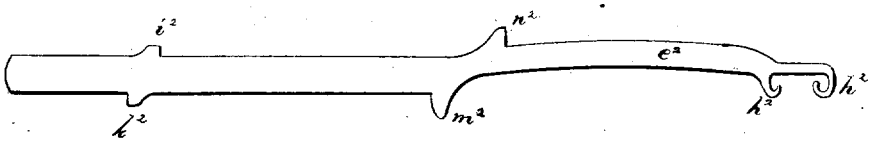
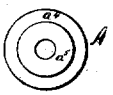
Witnesses.
Edw. W. Dorn
M. Sandner.
Inventor.
George Crompton
PER Crosby & Gregory ATTYS.
THE GRAPHIC CO. PHOTO-LITH. 39 & 41 PARK PLACE, N.Y.

UNITED STATES PATENT OFFICE.

GEORGE CROMPTON, OF WORCESTER, MASSACHUSETTS.

IMPROVEMENT IN LOOM SHEDDING MECHANISMS.

Specification forming part of Letters Patent No. 140,682, dated July 8, 1873; reissue No. 6,314, dated March 2, 1875; application filed February 20, 1875.

*To all whom it may concern:*

Be it known that I, GEORGE CROMPTON, of the city and county of Worcester, in the State of Massachusetts, have invented an Improvement in Looms; and I do hereby declare that the following, taken in connection with the drawings which accompany and form part of this specification, is a description of my invention sufficient to enable those skilled in the art to practice it.

The invention relates to that class of fancy-looms employing a harness mechanism having horizontal jack-bars for forming the shed, said bars being actuated by the lifter, depressor, and evener bars.

In my present arrangement I make the jacks as long bars, each having at its inner end two hooks or notches, to which the two harness-cords are fastened, the jack-bars adjacent to these ends passing through a guide and fulcrum plate, then between the evener-bars, then over the pattern chain or cylinder, and then between the lifter and depressor bars, the stress of the harness-cording pressing the free ends of the jack-levers down to or toward the cylinder, while the pins of the cylinder lift such ends to bring their hooks into the plane of movement of the lifter-bar, as required by the exigencies of the pattern. The harness-cords pass from the jacks about sheaves or pulleys mounted side by side, and the pattern-cylinder or shaft of the pattern mechanism is actuated by, and has imparted to it, an intermittent motion by means of a shaft connecting the wheel of the pattern-cylinder with a wheel on the crank or lay shaft.

My invention consists in a combination of mechanism, as hereinafter described, for actuating the harness mechanism; also, in sheaves having a single side flange, and arranged in connection with other sheaves, as hereinafter described; also, in the combination with the lay-shaft and pattern-cylinder shaft of a single rotating shaft, the parts being connected together substantially as described, and so as to impart to the pattern-cylinder an intermittent motion.

The drawing represents in end view, in plan, and in side elevation a harness mechanism embodying my invention.

*a* denotes the loom-frame; *b*, the frame that directly supports the pattern mechanism, and the lifter, depressor, and evener mechanism. *c d* denote two leaves of harness, and *e f* the top and bottom cording thereof. *g* denotes the usual rotating crank or lay shaft that actuates the lifter, depressor, evener, and pattern mechanism, said shaft carrying a bevel-gear, *h*, meshing into and driving a bevel-gear, *i*, at the foot of an inclined pattern-actuating shaft, *k*, at whose top is a wheel, *l*, carrying a pin, *m*, which intermittingly engages with a crown-wheel, *n*, on the end of the shaft that carries the pattern chain or cylinder *o*. From the wheel *h* extends a crank-pin, to which a link, *p*, is jointed, said link connecting the wheel to the end of a rocker-arm, *q*, extending from a shaft, *r*, that carries rockers *s t*, which reciprocate the lifter, depressor, and evener bars, one arm of the rocker *s* being jointed by a link, *t'*, to an arm extending from the slide-rod *u*, to which one end of the lifter-bar *v* and one end of the evener-bar *w* are connected, and the other arm of said rocker being jointed, by a link, *x*, to an arm extending from the slide-rod *y*, to which one end of the depressor-bar *z* and one end of the other evener-bar, *j*, are jointed, one arm of the other rocker, *t*, being connected, by a link, $a^2$, to a link, $b^2$, jointed at its opposite ends to the opposite ends of the lifter-bar *v* and evener-bar *w*, and the other arm of said rocker, by a link, $c^2$, to a link, $d^2$, the opposite ends of which are jointed to the opposite ends of the depressor-bar *z* and evener-bar *j*, the latter connections being in accordance with the inclination formed in the respective warps for each shed, and the connections of each rocker being made adjustable to vary the extent of such inclination. $e^2$ $f^2$ denote two of the jack-bars. Said bars are placed horizontally over the pattern chain or cylinder, and at their inner ends pass through slots in a guide and fulcrum plate, $g^2$, the bars resting upon the plate at the bottoms of the slots.

At the extreme end of each bar are two hooks or notches, $h^2$, to which the top and bottom cordings *e f* are respectively fastened, the top cording *e* extending from the end notch over a single guide-sheave to the top of the harness-leaf, and the bottom cording *f* extending over a guide-sheave (which is placed under the jack-bar) down vertically by the end of the loom-frame under another guide-sheave, and thence horizontally under another guide-sheave, and thence vertically up to the bottom of the harness-leaf. Adjacent to the fulcrum-plate the jack-bars pass between the two evener-bars $w\ j$, the jack-hooks $i^2\ k^2$ being always in the plane of movement of both evener-bars. Thence the jack-bars pass over the pattern chain or cylinder, and thence between the lifter and depressor bars, the jack-bars extending through vertical guide-slots $l^2$, and the ends of the jack-bars being free to move in these slots by the stress of the cording and the action of the pins or rings of the pattern cylinder or chain, such movement holding the lower hook $m^2$ of each jack-bar in the plane of movement of the depressor-bar $z$, or carrying each upper hook $m^2$ into the plane of movement of the lifter-bar $v$. The free ends of the jack-bars may be pressed down toward the cylinder by gravity, or by a suitable spring; but I prefer the arrangement of the harness-cording to hold them in normal position. The sheaves A are composed of a cylindrical hub, $a^5$, and a single side flange, $a^4$, and they are placed on their supporting-shafts in such order that the cylindrical hub of one sheave meets the flange of its adjacent sheave, and in this way two cylindrical hubs, about which the harness-cordings pass, are separated by but one flange, and I am enabled to bring the sheaves closely together on their shafts, and this allows the use of a greater number of sheaves within a given space, and consequently the harness-frames can be brought closer together, which is a matter of very great importance.

In all sheaves heretofore constructed, so far as I am aware, there have been flanges at each side of the cylindrical hubs; and, besides economizing space, my sheaves are cheaper to construct, and require less material.

The connection between the lay or crank shaft and the rotary pattern mechanism is accomplished by means of a single shaft, and the said shaft, by means of the pin and crown-wheel connection between it and the pattern-cylinder shaft, imparts to the pattern-cylinder an intermittent rotation, so as to operate jacks at the proper time. The connections between the pattern-cylinder-actuating shaft $k$ and the pattern-cylinder shaft are the wheel $l$ and pin $m$, and crown-wheel $n$, and a continuous rotation of one shaft imparts an intermitting rotation to the other shaft.

I claim—

1. The hooked jack-bars with their cording-notches, in combination with the fulcrum-plate, and with lifter, depressor and evener bars and pattern mechanism, arranged substantially as described.

2. In combination, jack-bars having cording-notches $h^2$, the lifter and depressor bars, evener-bars, fulcrum-plate, harness-cording, and pattern chain or cylinder, arranged to operate substantially as described.

3. In combination, two or more sheaves having single flanges, and arranged with respect to each other to guide the harness-cording, substantially as and for the purpose set forth.

4. A sheave for harness-cording in looms, having a cylindrical body and single flange, substantially as described.

GEO. CROMPTON.

Witnesses:
G. W. GREGORY,
E. C. WEAVER.